Patented Nov. 5, 1929

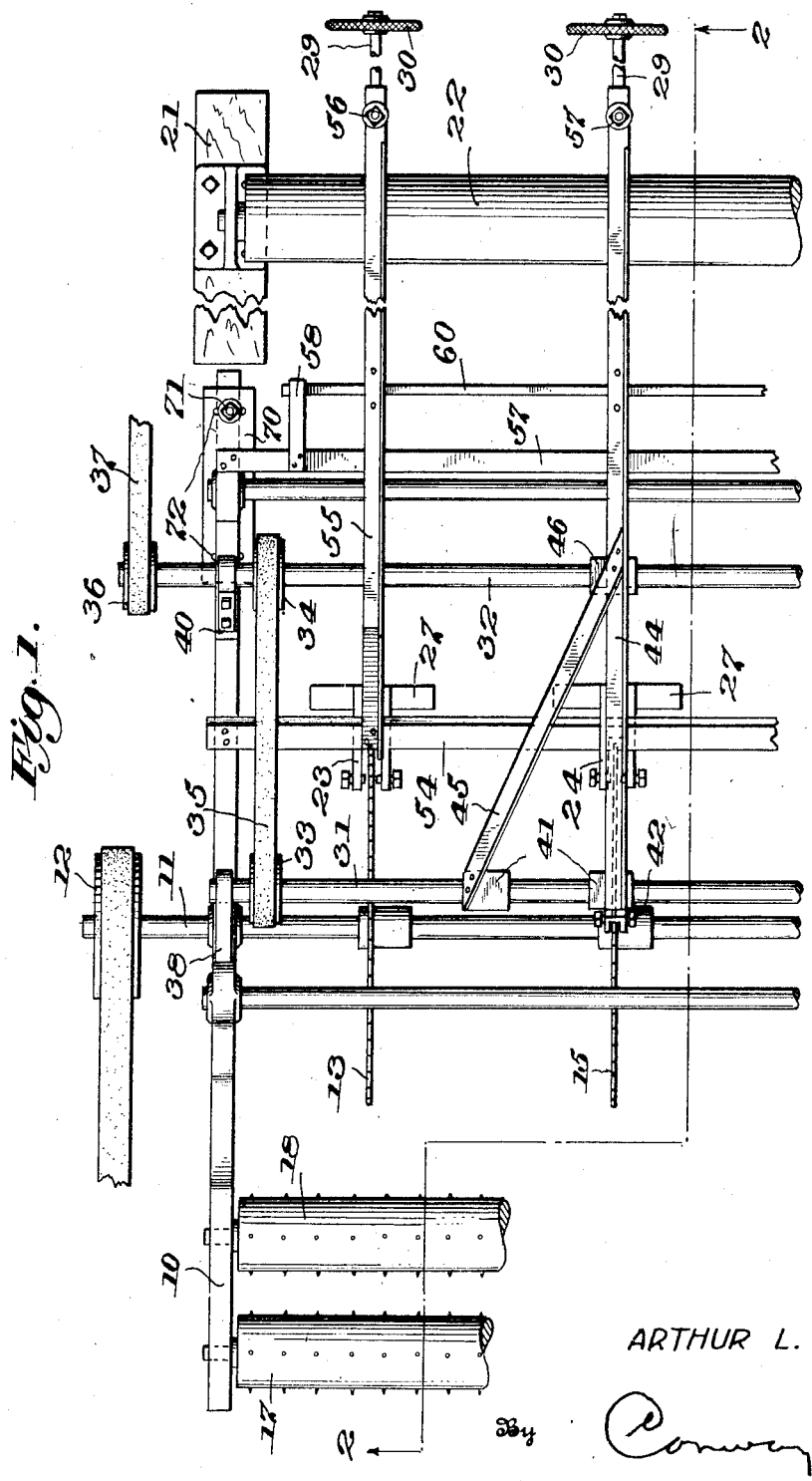

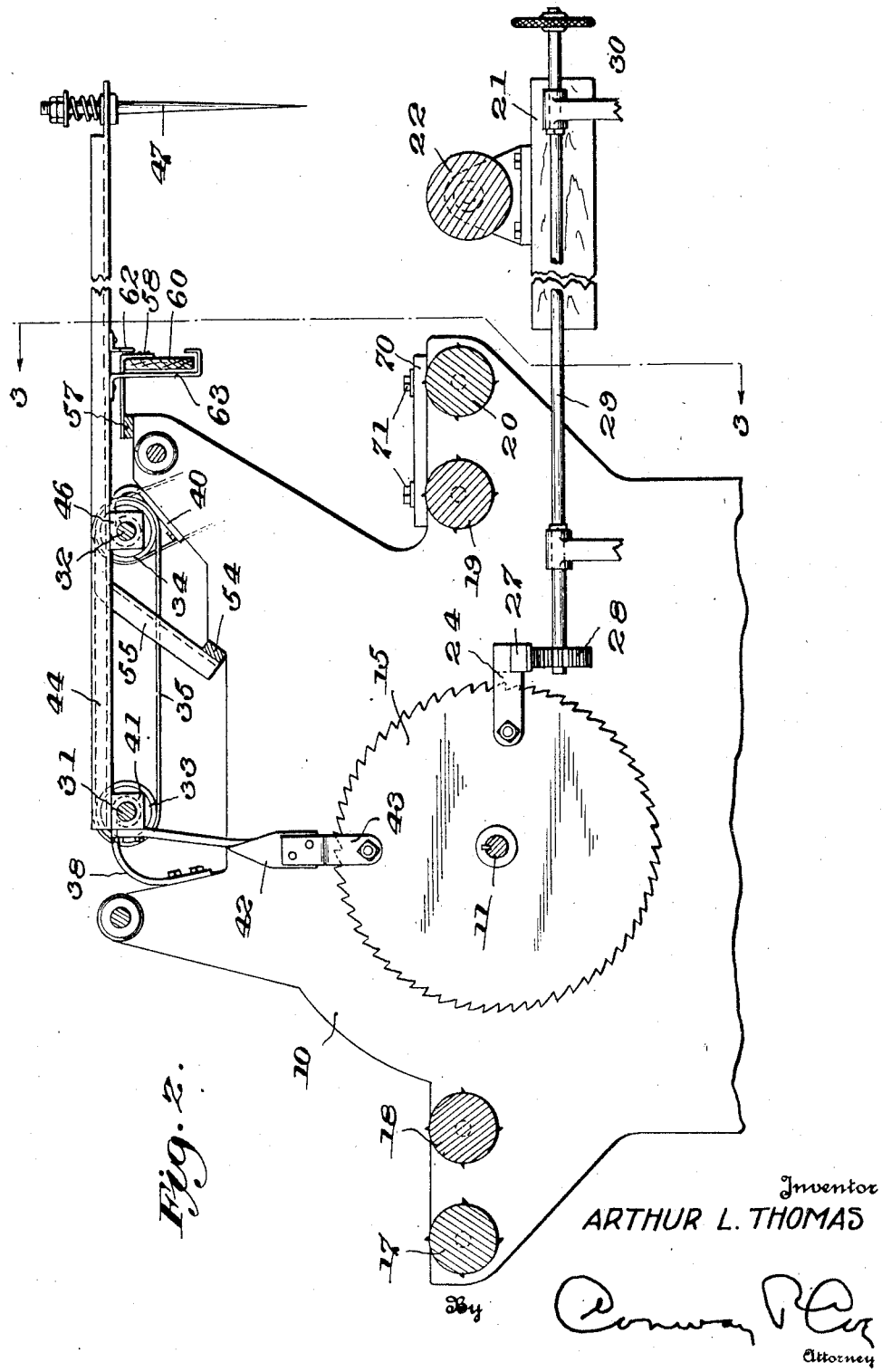

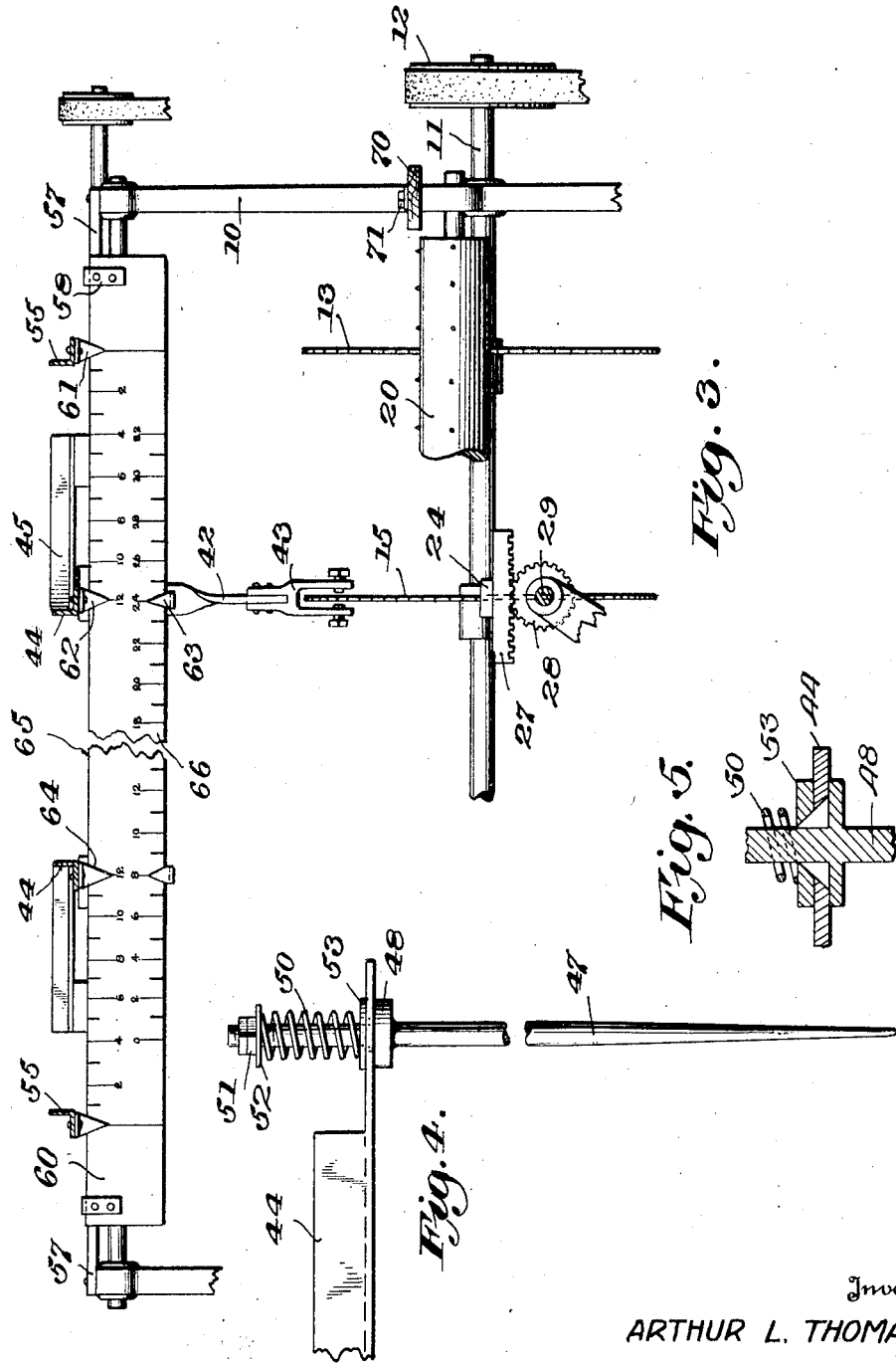

1,734,887

UNITED STATES PATENT OFFICE

ARTHUR L. THOMAS, OF NORTH CHARLESTON, SOUTH CAROLINA

SHIFTING MECHANISM FOR EDGERS AND THE LIKE

Application filed May 11, 1927. Serial No. 190,413.

This invention relates to mechanism for shifting the saws of edgers and similar machines, and is particularly designed to provide means for alining the saws with respect to the work.

An object of the invention is to provide a member projecting forwardly of the saw and alined therewith, to assist the operator in determining the path of the saw-cut for some distance in advance of the saw.

Another object is to provide means whereby a board of the greatest possible width may be cut from a given slab.

Further objects will appear from the following description, taken in connection with the accompanying drawings, wherein Fig. 1 is a plan view showing one-half of a machine showing an embodiment of the invention;

Fig. 2 is a section on the line 2—2 of Fig. 1;

Fig. 3 is a front elevation of the figure board and its associated mechanism, taken on the line 3—3 of Fig. 2; and Fig. 4 is a detail view of one of the pointers.

Fig. 5 is a vertical cross section through the pointer and its attaching means.

Referring more particularly to the drawings, the machine comprises the usual frame 10, having a saw arbor 11 journaled therein and driven by a pulley 12 from any suitable source of power. Fixed to the arbor 11 is a relatively stationary saw 13 which, however, may be adjusted lengthwise of the arbor, if such adjustment is found necessary. 15 is a shiftable saw which may be quickly shifted lengthwise of the arbor by means to be described. The usual feed rolls 17, 18, 19 and 20 are provided at the front and rear of the saws to feed the work thereto, and suitable pressure rolls (not shown) may be provided to hold the work into contact with the feed rolls. At the front of the saws, a conveyor frame 21 is provided, having live rolls 22 which are driven in known manner to move the work to the feed rolls. Guides 23 and 24 engage the forward edges of saws 13 and 15, and are secured to racks 27 which may be reciprocated by means of pinions 28 to shift the saws longitudinally of the arbor 11. The pinions 28 are mounted on shafts 29, which are provided at their opposite ends with handwheels 30 positioned at the forward end of the conveyor frame, so that the operator, by turning the handwheels, can shift the saws as desired.

The mechanism above described is known, and forms no part of the present invention. It should be noted that the description thereof is merely illustrative, since the invention may be applied to other types of edgers.

At the upper portion of the frame 10, shafts 31 and 32 are provided, upon which are mounted pulleys 33 and 34. A belt 35 passes over the two pulleys. Another pulley 36 is provided at the end of shaft 32 and is continuously driven by means of belt 37 from any convenient source of power, preferably from the feed roll shaft. Suitable supporting means such as brackets 38 and 40 are secured to the frame 10 and carry the bearings for the shafts 31 and 32. The arrangement of these brackets must necessarily be modified according to the type of edger to which the invention is applied. Upon shaft 31 at each side of the longitudinal center line of the machine are mounted two bearing blocks 41, one of which carries a depending arm 42, to which is secured a guide 43 similar to the guide 24. A beam 44 and a brace 45 are secured to the blocks 41, the beam extending forwardly of the saw a distance of six feet, more or less, while the brace is secured to the beam to increase its stability. A block 46 is secured to beam 44 and engages the shaft 32 to hold the beam in horizontal position. The purpose of the mechanism just described is to provide means for supporting beam 44, while permitting the beam to move laterally with a minimum of friction. Thus, the constantly rotating shafts 31 and 32 cooperate with the bearing blocks 41 and 46 to form a support for beam 44 whereby it may be easily shifted in a lateral direction without binding. Such shifting will occur whenever the saw 15 is shifted by means of handle 30, the motion being transmitted through members 43 and 42.

At the end of beam 44 is a pointer 47, having a flange 48 which is held in yielding contact with beam 44 by means of a spring 50 positioned between collars 52 and 53 and adjusted by means of nuts 51. The lower collar 53 is provided with a frusto-conical bore, as shown in Fig. 5, and the end of the beam 44 has a similar frusto-conical bore which is a continuation of the bore in the collar, the arrangement being such that the pointer, if struck by an object such as a board, may yield and thereby transmit a minimum of stress to the beam 44 and its associated parts.

A cross bar 54 extends across the framework of the machine, and forms a support for a bent beam 55 which is fixedly secured thereto by bolts or other suitable means. It will be noted that this arrangement prevents ready shifting of saw 13, but in practice this saw is seldom shifted, hence the simple arrangement just described will usually be found satisfactory.

Beams 44, 45 and 55 are preferably formed of light angle irons. A pointer 56 is mounted on the end of beam 55, and is of similar construction to pointer 47.

A bar 57 extends across the frame and supports, by means of brackets 58, a figure board 60 provided with scales 64 and 65, graduated in inches of lateral distance from saw 13. Upper indexes 61 and 62 are secured to beams 55 and 44 respectively to move over scale 65 and thereby enable the operator to gage the positions of the saws. A lower index 63 depends from beam 44 and cooperates with scale 66, which may be graduated to show the distance from some point at the other side of the machine.

A straightedge 70 is provided at each side of the frame 10, and is adjusted by means of bolts 71 and slots 72 to vary the distance between saw 13 and the edge of a board being sawed.

The operation is as follows:

The operator stands at the rear end of the machine and feeds boards or slabs thereto. Saw 13 is set a given distance from the straightedge 70, with the result that a cut of given width will be taken from the right side of the board or slab. In setting the saw 15, the operator aims to cut the defective edge portion from the board, but does not want to cut more material than is necessary to remove said edge portion. Also, the cuts must be made in even inches. The setting of the shiftable saw has in the past been done largely by guesswork, but with the present invention the operator can accurately set the saw to cut the minimum edge portion from the board while still removing all that needs to be removed. Glancing down the length of the board, he turns handwheel 30 to aline the pointer 47 with the cut proposed to be made, and in so doing sets the saw. He then further adjusts the position of the saw to bring pointer 62 in alinement with one of the inch-marks on the figure-board 60, and feeds the board to the saws.

Having described my invention, what I claim as new and desire to secure by Letters Patent of the United States is:

1. In combination with an edger having a shiftable saw, and means for shifting said saw; a sighting pointer alined with said saw and positioned a substantial distance forwardly thereof, and means operable by said saw, when it is shifted, to shift said pointer.

2. In a combination with an edger having a shiftable saw, and means for shifting said saw; a sighting pointer alined with said saw and positioned a substantial distance forwardly thereof, a supporting member for said pointer, and a guide member carried by the rear end of said supporting member and engaging said saw to be moved thereby.

3. In combination with a sawing machine having a rotary saw, and means for shifting said saw along its axis, a pointer positioned forwardly of said saw, a supporting member for said pointer, a guide member carried by the rear end of said supporting member and engaging said saw to be moved thereby, a continuously rotating shaft, a block bearing on said shaft and adapted to support one end of said supporting member and means for supporting the other end of said supporting member.

4. In a rotary saw machine, a supporting member extending forwardly of said saw, a sighting pointer depending therefrom, and a resilient connection between said pointer and said supporting member for permitting universal movement therebetween.

5. In combination with an edger having a shiftable saw, and means for shifting said saw; a measuring scale, an index mounted for movement over said scale, means for moving said index to indicate the position of the saw when the latter is shifted, a sighting pointer alined with said saw and positioned at a relatively great distance forwardly thereof, and means operable by the shifting of the saw to shift said pointer.

6. In an edger having a plurality of rotating shafts and a shiftable saw and means for shifting said saw, a sighting pointer positioned forwardly of said saw, a supporting member for said pointer, means for supporting said supporting member on said rotating shafts, and means operable by said saw when it is shifted to shift said pointer.

ARTHUR L. THOMAS.